(12) United States Patent
Markson

(10) Patent No.: US 7,175,274 B1
(45) Date of Patent: Feb. 13, 2007

(54) COMBINATION SUNGLASSES AND READING EYEGLASSES

(76) Inventor: Jeffrey F. Markson, 244 Longhouse La., Slingerlands, NY (US) 12159

( * ) Notice: Subject to any disclaimer, the term of this patent is extended or adjusted under 35 U.S.C. 154(b) by 0 days.

(21) Appl. No.: 11/236,986

(22) Filed: Sep. 28, 2005

Related U.S. Application Data

(63) Continuation-in-part of application No. 10/955,059, filed on Oct. 1, 2004, now abandoned.

(51) Int. Cl.
*G02C 9/02* (2006.01)

(52) U.S. Cl. .......................... 351/59; 351/57

(58) Field of Classification Search .................. 351/57, 351/59, 41, 158, 54, 55, 58
See application file for complete search history.

(56) References Cited

U.S. PATENT DOCUMENTS

| | | | |
|---|---|---|---|
| 1,206,457 A * | 11/1916 | Mills ............................ 351/57 |
| 4,666,266 A | 5/1987 | Morrison ...................... 351/57 |
| 5,056,906 A | 10/1991 | Akiyoshi ....................... 251/57 |
| 5,106,178 A | 4/1992 | Akiyoshi ....................... 351/57 |
| 5,598,232 A * | 1/1997 | Pronesti ........................ 351/54 |
| 6,356,400 B1 * | 3/2002 | Goff et al. ................... 359/802 |
| 6,764,176 B1 * | 7/2004 | Carlson et al. ............... 351/59 |
| 2004/0021823 A1 | 2/2004 | Wang ........................... 351/47 |

* cited by examiner

*Primary Examiner*—Hung Xuan Dang
(74) *Attorney, Agent, or Firm*—Heslin Rothenberg Farley & Mesiti P.C.; Victor A. Cardona

(57) ABSTRACT

An eyeglasses assembly includes an eyeglass frame, a temple member, a first lens and a second lens. The first lens is connected to the frame and is positioned to allow a wearer of the frame to look through the first lens. The second lens is moveably connected to the frame such that the second is moveable from a first position to a second position. The first position allows a wearer to look through the first lens and the second lens, and the second position is substantially away from the first position in a direction toward the temple member.

13 Claims, 8 Drawing Sheets

US 7,175,274 B1

COMBINATION SUNGLASSES AND READING EYEGLASSES

CROSS REFERENCE TO RELATED APPLICATIONS

This application is a Continuation-in-Part of U.S. patent application Ser. No. 10/955,059, filed Oct. 1, 2004, now abandoned entitled "Combination Sunglasses and Reading Eyeglasses", the entire disclosure of which is incorporated herein by reference.

TECHNICAL FIELD

The present invention relates generally to improvements in a combination sunglasses and vision-correcting and/or reading eyeglasses in which, more particularly, the improvements facilitate selecting a one of the two eyeglasses end-uses as needed, and maintaining the one of the eyeglasses that is not selected for use in a desirable assembled relation to the in-use eyeglasses, thereby obviating loss or misplacement.

BACKGROUND

Combination different functioning eyeglasses are well known in the prior art, as exemplified by patent 5,106,178 for "PRESCRIPTION LENS HOLDER FOR USE WITH SUNGLASSES" issued to Minoru Akiyoshi on Apr. 21, 1992, and patent application publication No. US 2004/0021823 for "AUXILIARY LENS MODULE" published by Jeff Wang on Feb. 5, 2004, to mention but a few. The need for different functions in eyeglasses is addressed by the noted and all other known prior art, but has eluded an entirely satisfactory solution. This, it is believed is due to a resulting conundrum that when one function is being used, the use of the other function is in abeyance and the lenses therefore are in a condition of non-use.

As known from common experience with reading eyeglasses, for example, when not being used for reading the eyeglasses are usually misplaced or outright lost. Likewise in going from indoors to outdoors, sunglasses are typically, through oversight, not carried on the person.

Broadly, it is an object of the present invention to overcome the foregoing and other shortcomings of the prior art.

More particularly, it is an object to use to advantage the in-place operative position of the sunglasses to obviate the loss of the other eyeglasses and to readily deploy the other eyeglasses, all as will be better understood as the description proceeds.

SUMMARY OF THE INVENTION

The present invention provides an eyeglasses assembly which includes an eyeglass frame, a temple member, a first lens and a second lens. The first lens is connected to the frame and is positioned to allow a wearer of the frame to look through the first lens. The second lens is moveably connected to the frame such that the second lens is moveable from a first position to a second position. The first position allows a wearer to look through the first lens and the second lens, and the second position is substantially away from the first position in a direction toward the temple member.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

DETAILED DESCRIPTION OF THE DRAWINGS

Figure 1:
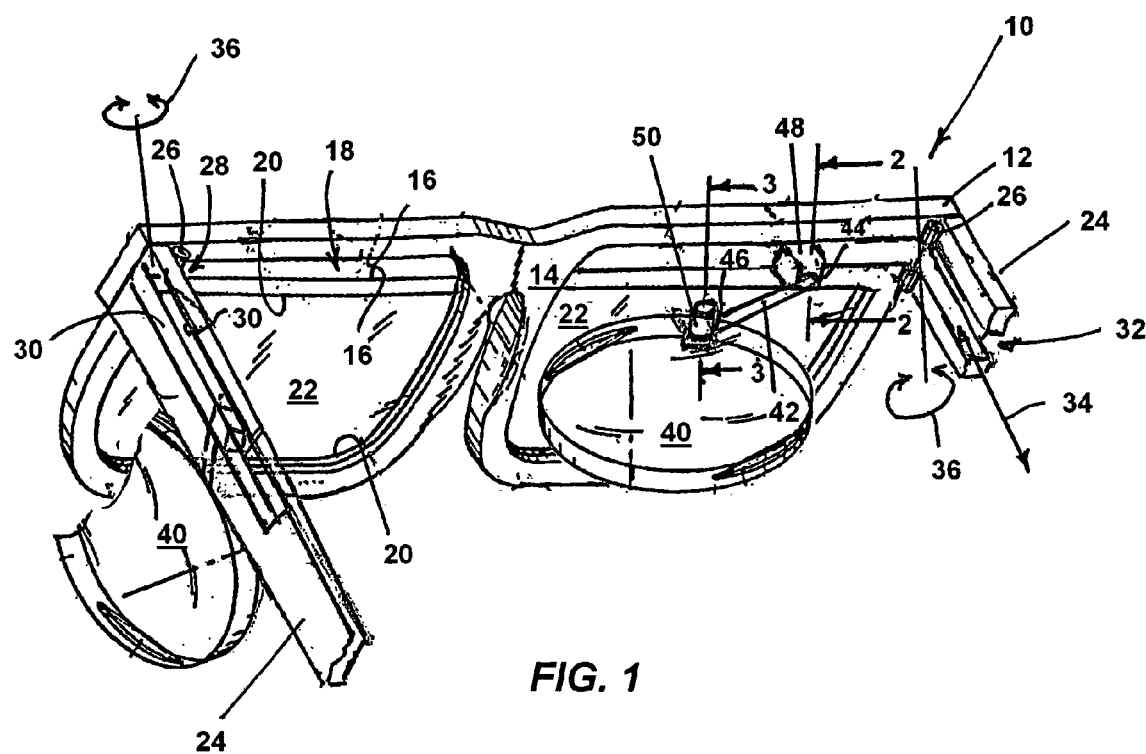
FIG. 1 is a partial perspective view of a combination sunglasses and reading glasses according to the present invention.

Shown in the drawings is a combination sunglasses and vision-correcting eyeglasses, such as optionally for presbyopic vision correction and for reading, generally designated 10 for such end-uses, the sunglasses function being provided by a frame 12 configurated with an upper horizontally oriented frame length portion or body member 14 which includes a first set of correspondingly horizontally oriented spaced apart edges 16 bounding a first tracking slot 18 therebetween.

A second set of edges 20 in the frame configuration below the slot 18 bound operative sites for sunglass lenses 22 adhesively or otherwise appropriated disposed in place therein.

Completing the construction of the sunglasses 10 are left and right temple members 24 attached by hinges 26, as at 28, to extend rearwardly to support the sunglasses 10 on a user during use. In the temple members 24 there is a third set of edges 30 in spaced apart relation bounding a second tracking slot 32 therebetween, in horizontally aligned relation to the first tracking slot 18 so that, as will be subsequently explained, a tracking configured component as best illustrated in FIG. 2, can partake of tracking movement 34 in opposite directions along the tracking slots 18, 32, and including during such movement a rotational degree of movement 36 going from one tracking slot 18 to the other tracking slot 32.

Figure 2:
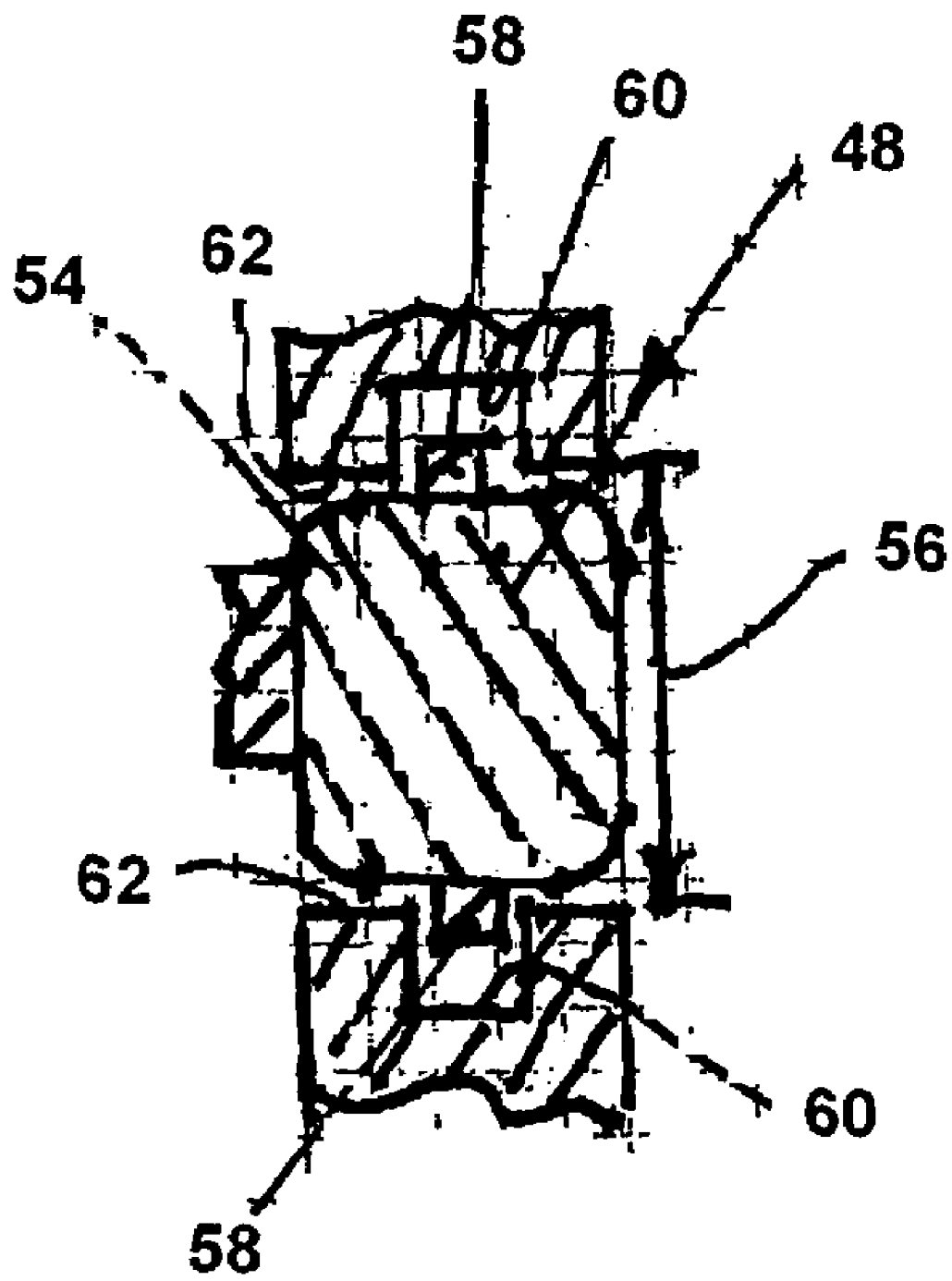
FIG. 2 is an isolated view on an enlarged scale, in section as taken along line 2—2 of FIG. 1, of a tracking configuration component of the combination eyeglasses.
Figure 3:
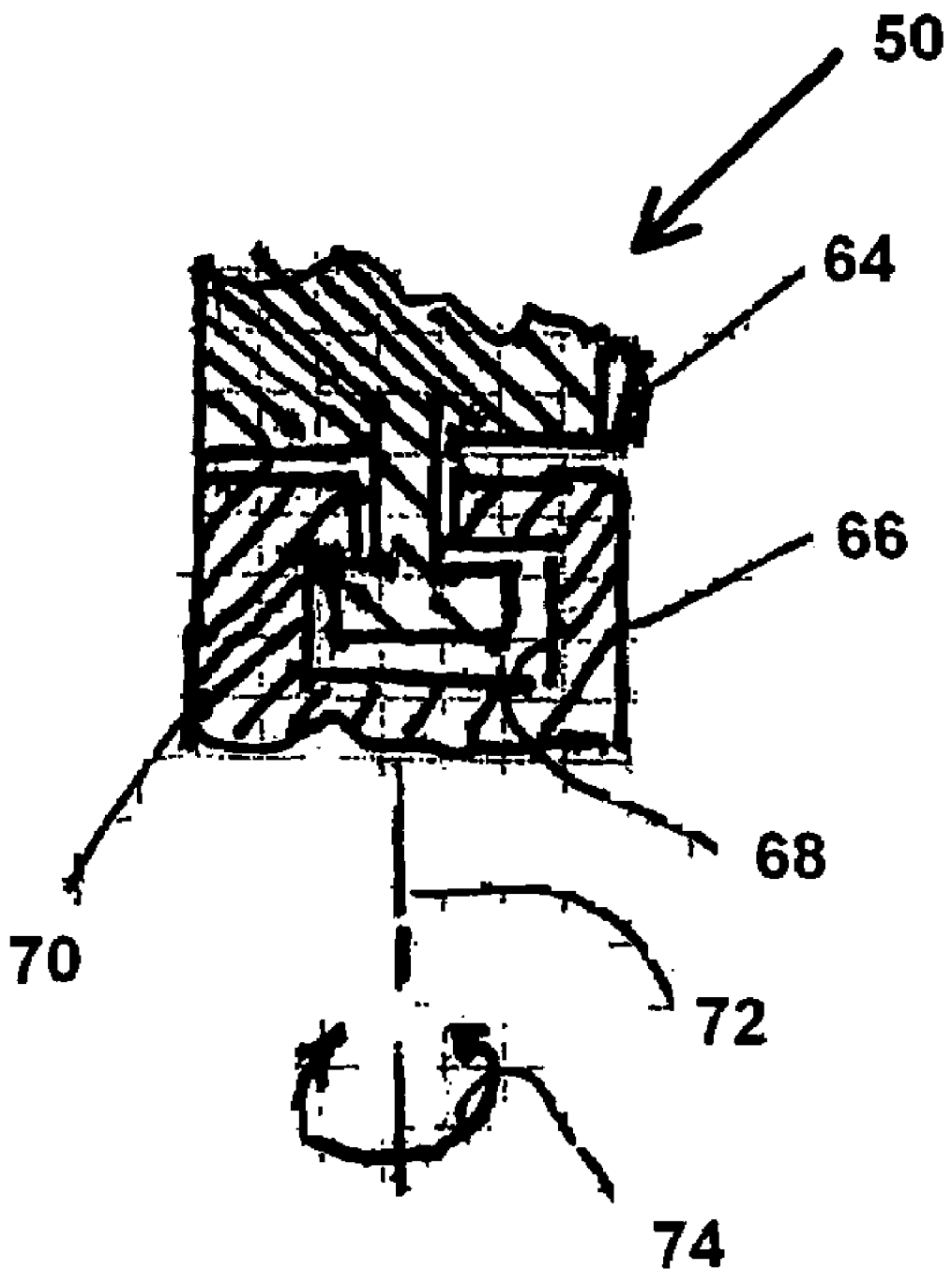
FIG. 3 is an isolated view, also on an enlarged scale and in section, but taken along line 3—3 of FIG. 1, and of a swivel component of the combination eyeglasses.

The reading eyeglasses 38 function is provided by a pair of optical lenses 40 and for each a cooperating support member 42 having opposite ends 44 and 46, the one end 44 having an integral attachment to the FIG. 2 noted tracking configuration components, generally designated 48, and the other end 46 a similar integral attachment to the FIG. 3 swivel component, generally designated 50.

The operative positions of the support members 42 in assembled relation to the optical lenses 40 are positions in which the tracking configurations 48 are disposed to partake of the noted tracking movements 34 and 36 in relation to the first and second tracking slots 18 and 32. Thus, a non-use condition of the optical lenses 40 is in an out-of-the-way condition which does not interfere with the sun blocking function of the sunglasses but, in remaining attached to the sunglasses, obviates inadvertent loss or misplacement of the optical lenses 40, and to deploy the optical lenses 40 to a reading or visual compensating function is readily achieved by manually urging the assembly of optical lenses 40 and support members 42 in tracking movements 34 and 36.

The FIG. 2 tracking configuration 48 will be understood for completeness sake, to include a body 54 shaped and sized to be accommodated in the tracking slots 18, 32, as noted at 56, having upper and lower projections 58, circular in shape, projected into grooves 60 in the surfaces 62 bounding the slots 18, 32, and an inboard side attached to a support member 42.

The FIG. 3 swivel 50 will be understood for completeness sake, to include an upper body 64 with a depending shape 66 disposed in a notch 68 of a lower body 70 establishing a rotating axis 72 of the sliding upper body 64 attached to the support member end 46 in relation to the lower body 70 having the degree of rotation 74 about the axis 72 and adhesively or otherwise appropriately attached to an optical lens.

Figure 4:
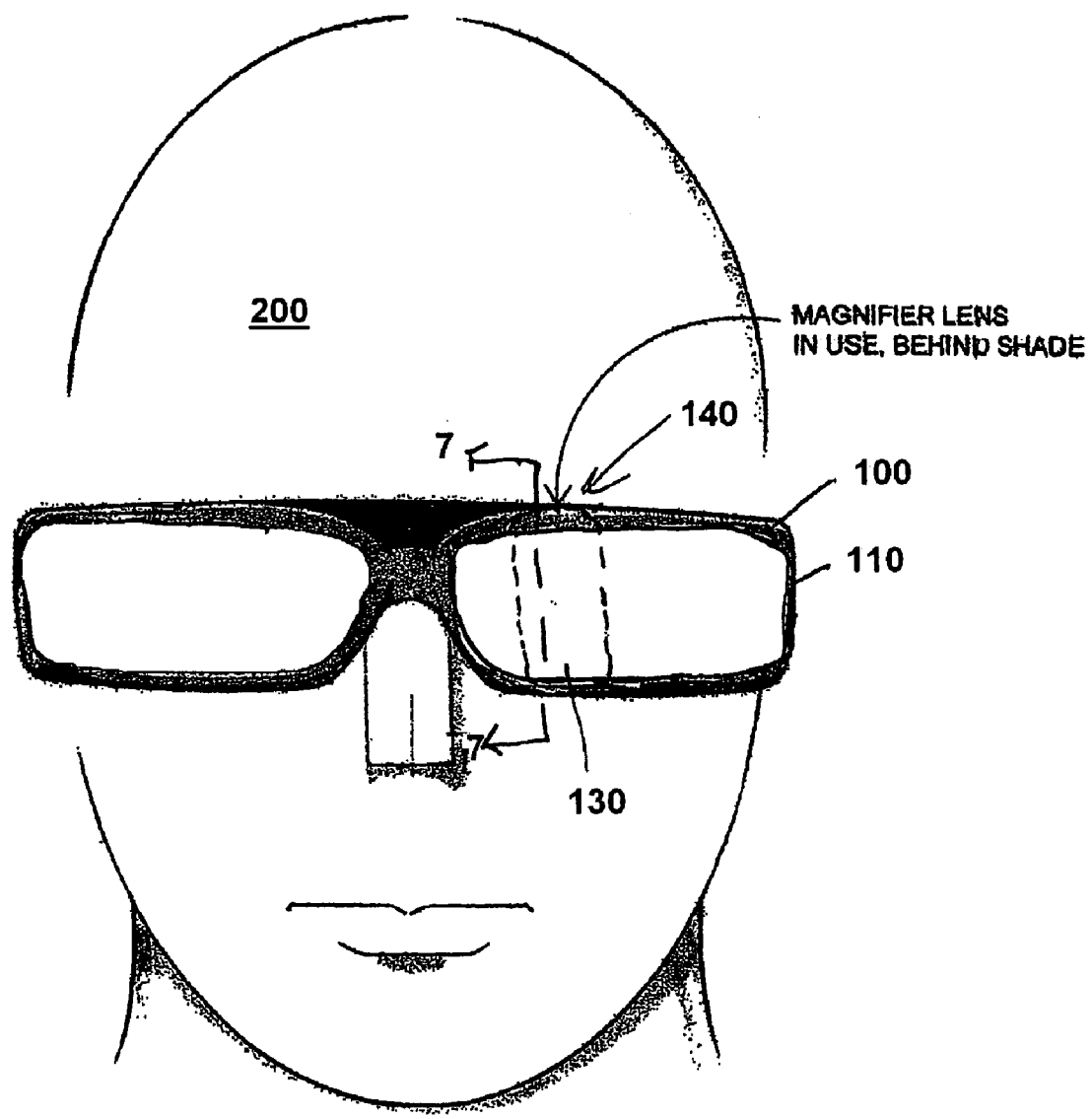
FIG. 4 is a front elevational view of an eyeglasses assembly in accordance with the present invention.
Figure 5:
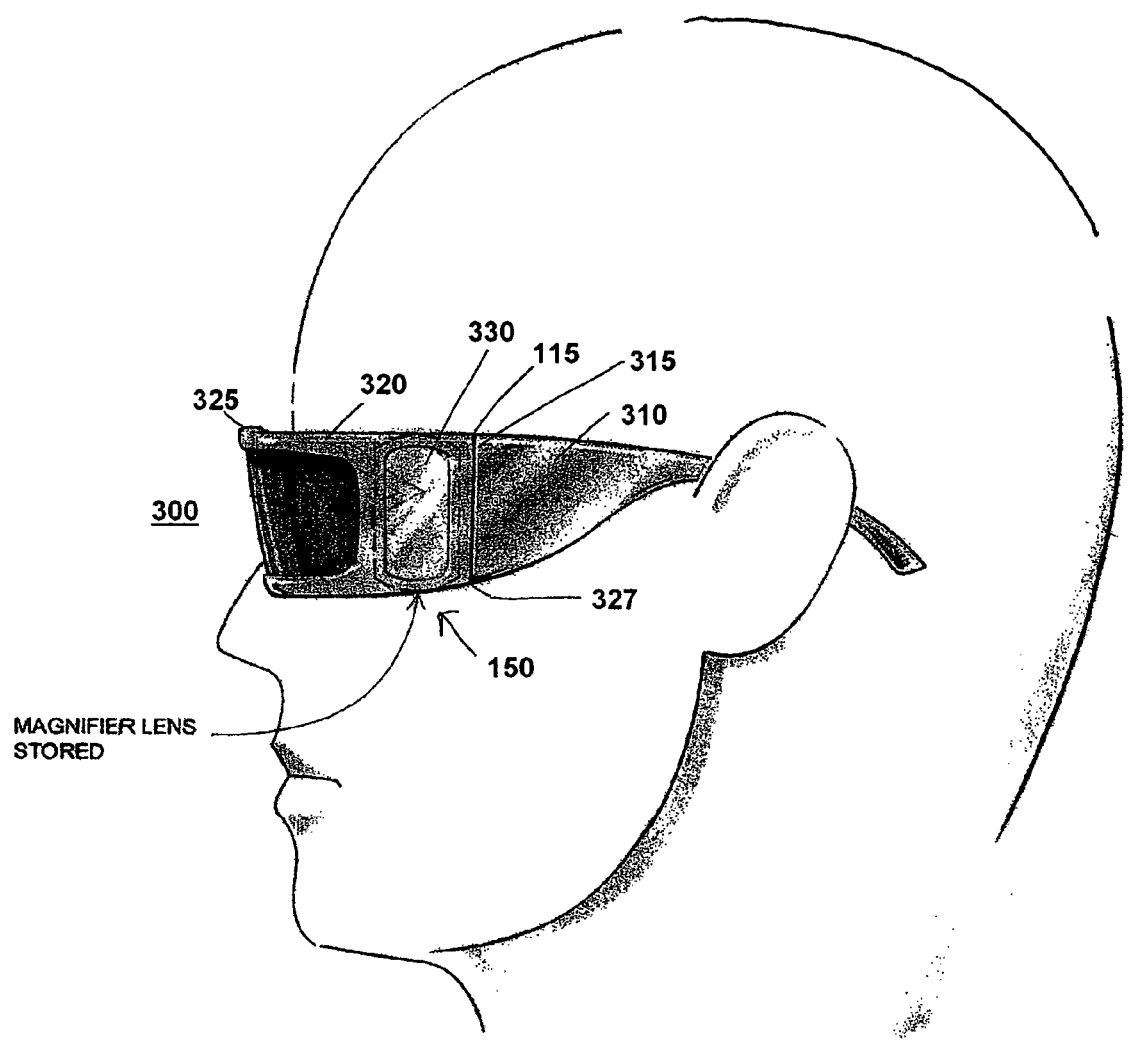
FIG. 5 is a side elevational view of the eyeglasses assembly of FIG. 4.
Figure 6:
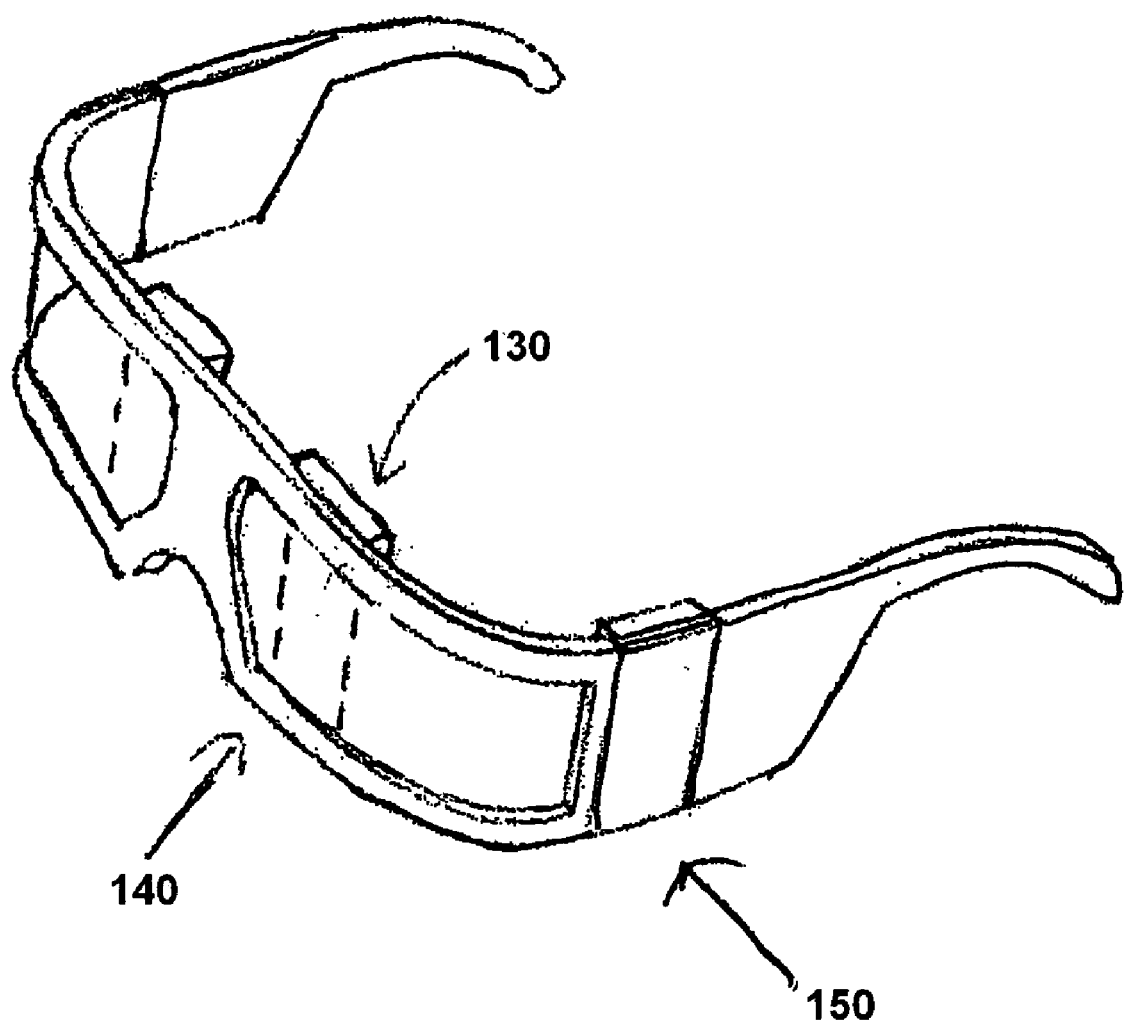
FIG. 6 is a perspective view of the eyeglasses assembly of FIG. 4.

In an alternate embodiment, an eyeglass frame 100 includes a first lens 110, which may be a clear lens, a sunglass lens (e.g., shades), and/or an optical corrective lens, as depicted in FIGS. 4–6. A second lens 130 is movably attached (e.g., slidably mounted) to frame 100 and this lens may be a sunglass lens and/or an optical corrective lens. Second lens 130 may be movable between a first in-use position 140, as depicted in phantom lines in FIG. 4 and FIG. 6, and a second storage position 150 as depicted in phantom lines in FIG. 5. For example, first lens 110 may be a non-corrective sunglass lens and second lens 130 may be a reading lens. In such example, a wearer 200 may use eyeglass frame 100 with first lens 110 (i.e., look through first lens 110 while second lens is in storage position 150) when outside in the bright sun and performing activities which do not require reading (e.g., playing golf). When it is necessary for the wearer to read (e.g., to record a score on a golf card), he or she may slide second lens 130 from storage position 150 to in-use position 140 and look through second lens 130 (and first lens 110) to allow reading. In another example, first lens 110 may be a corrective lens (e.g., clear or sunglass lens) allowing the wearer to see distances (e.g., aid a nearsighted or myopic wearer) and second lens 130 may be a reading lens which may be utilized therewith.

Storage position 150 may be located at any point between first position 140 and an end 115 (FIG. 5) of frame 100. Preferably, storage position 150 is located substantially away from the first position in a direction toward one of temple members 310 (FIG. 5). For example, storage position 150 may be located outside a normal range-of-sight or field-of-vision of the wearer. However, storage position 150 could be located partially within such a range-of-sight or field-of-vision. Further, second lens 130 is preferably located on the back side of frame 100 such that it is not visible by an observer from a front side 300 (FIG. 5) in first position 140, storage position 150 or any position in between.

Figure 7:
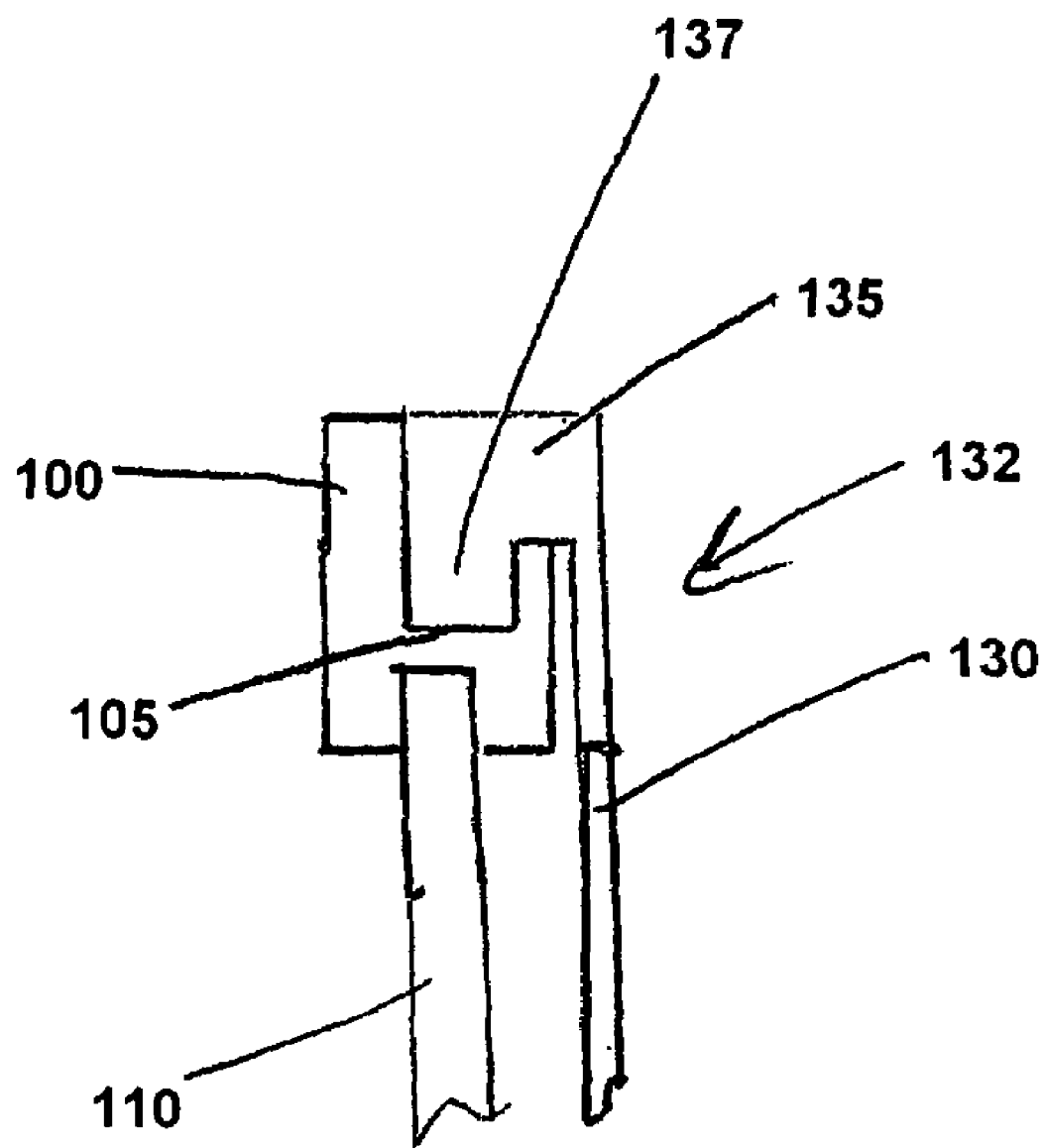
FIG. 7 is an enlarged cross-sectional view of the eyeglasses assembly of FIG. 4 taken along line 7—7 of FIG. 4.

Second lens 130 may be connected to a support member 135 to form a second lens assembly 132 as depicted in FIG. 7. Frame 100 may include a track or groove 105 configured (e.g., shaped and dimensioned) to receive an extension 137 of support member 135. Inserting extension 137 into groove 105 movably (e.g., slidably) attaches frame 100 to second lens 130. Lens 130 may be connected by support member 135 or multiple such support members.

Temple members 310 may be hingedly connected to a front portion 320 of frames 100 as depicted in FIG. 5. Also, front portion 320 and/or temple members 310 may be configured (e.g., shaped and dimensioned) to allow second lens 130 to be received behind a lens cover portion 330 located at storage position 150. In particular, lens cover portion 330 may be dimensioned to cover a lens (e.g., second lens 130) of a size sufficient to allow a user to look therethrough when the lens is located in in-use position 140. For example, lens cover portion 330 may be at least as large, and may have a shape which is complimentary relative to, second lens 130. Also, front portion 320 may extend from a front end 325 toward temple members 310 a distance sufficient to allow cover 330 to cover second lens 130 when located in storage position 150. For example, a back edge 327 of front portion 320 may connect to a front edge 315 of temple member 310 at a point which is away from the eyes of the wearer a distance sufficient to allow cover portion 330 to be located away from (e.g., outside of) a normal range-of-sight or field-of-vision of the wearer. In another example, cover portion 330 may be located at storage position 150, which may be located within the peripheral vision of the wearer when the wearer is wearing eyeglass frames 100 in a usual manner. In yet another example, lens cover portion 330 may be transparent or translucent such that second lens 130 may be viewed from a front side of frame 100. Also, second lens 130 may be located in storage position 150 such that some or all of second lens 130 is visible from behind frame 100. For example, second lens 130 may be larger than frame 100 in storage position 150 or frame 100 may include openings which allow second lens 130 to be seen therethrough when second lens 130 is located in storage position 150.

In another unillustrated example, temple member 310 may include a groove (not shown) aligned with groove 105 of frame 100 to allow support member 135 to be moved therethrough such that second lens 130 is attached to temple member 310. In such an example, temple member 310 may be sized and dimensioned to cover second lens 130 such that it is not visible from a front side thereof when second lens 130 is attached to temple member 310.

Figure 8:
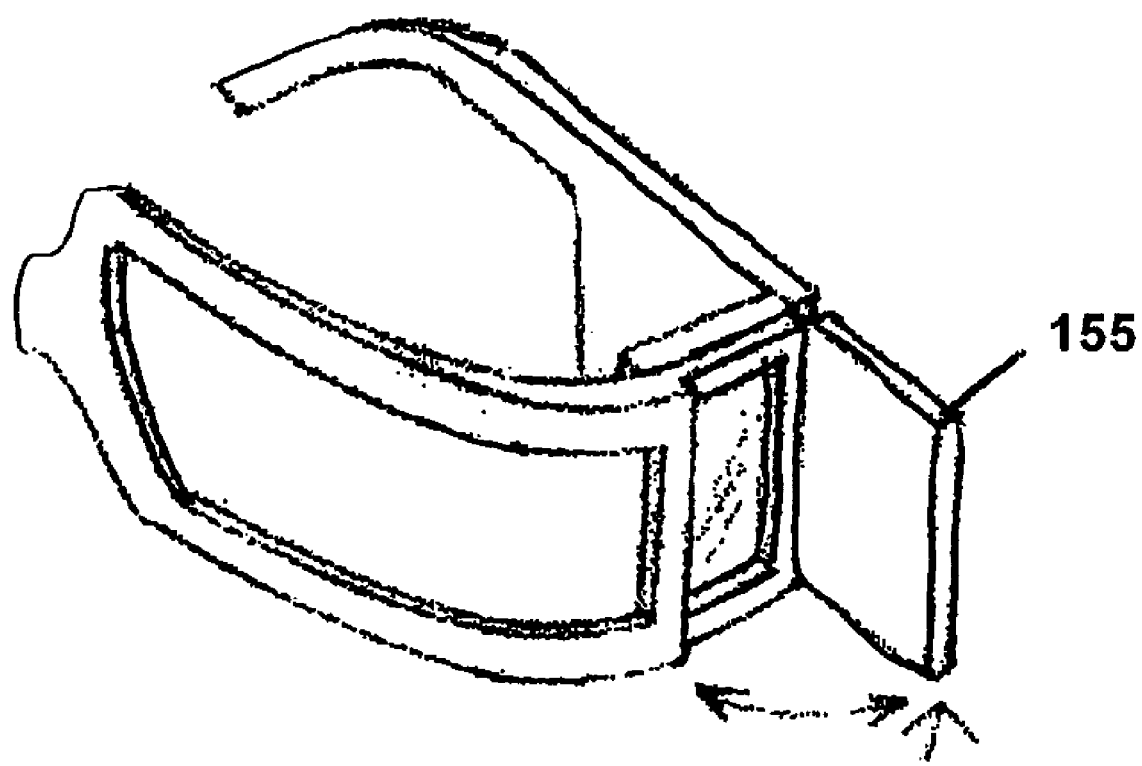

An openable door 155 may be located in storage position 150 to allow access to lens 130, e.g., to allow lens 130 to be cleaned from a front side as depicted in FIG. 8. Storage position 150 could be open on a back side toward the wearer or it could include a sleeve (not shown) enveloping lens 130 on front and rear sides when located in storage position 150. Such sleeve (not shown) may protect lens 130 when located therein.

As will be understood by one skilled in the art, second lens 130 may be connected to eyeglass frame 100 in any way which allows it to be connected to frame 100 while being moved or translated from in-use position 140 to storage position 150. Also, second lens 130 may also be detachably connectable to frame 100 to facilitate cleaning thereof. For example, extension 137 of support member 135 and groove 105 may be sized and dimensioned in any number of ways to inhibit separation of extension 137 from groove 105, and/or to allow the detachable connection of extension 137 to groove 105. Further, instead of frame 100 and/or temple member 310 including one or more grooves, frame 100 and/or temple member could include a ridge or protrusion, and support member 135 could include a clamp or other means for attaching to the protrusion or other part of frame 100. In another example, support member 135 could include a protruding member configured (e.g., sized and dimensioned) to be received in a keyhole slot of frame 100 and/or temple member 310.

As will also be understood by one skilled in the art, eyeglass frame 100 preferably includes two first lenses 110 (e.g., non-optically corrective sunglass lenses) and two second lenses 130 (e.g., reading lenses) for use with the first lenses. In other examples, first lens 110 and second lens 130 could be clear non-optically corrective lenses, clear optically corrective lenses, sunglass non-optically corrective lenses or sunglass optically corrective lenses. In a further example, first lens 110 may be a sunglass lens of a different tint density than second lens 130. Such different tint density would allow a wearer to adjust the desired tint density based on the brightness of the sun or other lighting source. It will be understood by those skilled in the art that the lenses described herein (e.g., first lenses 110 and second lenses 130) may be formed of any optical material such as polycarbonate and such lenses may be polarized or non-polarized.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An eyeglasses assembly comprising:
    an eyeglass frame;
    a temple member;
    a first lens connected to said frame and positioned to allow a wearer of said frame to look through said first lens;
    a second lens slidably connected to said frame such that said second lens is slidable from a first position to a second position, said first position allowing a wearer to look through the first lens and the second lens, said second position being substantially away from said first position in a direction toward said temple member.

2. The eyeglasses assembly of claim 1 wherein said frame comprises a lens cover portion and wherein said second lens is located behind said lens cover portion such that said second lens is hidden from a front side of said frame when located in said second position, said front side being opposite from the wearer.

3. The eyeglasses assembly of claim 2 wherein said lens cover portion comprises a door to allow access to a front side of said second lens.

4. The eyeglasses assembly of claim 1 wherein said second lens is slidably connected to said frame.

5. The eyeglasses assembly of claim 4 wherein said frame and said groove comprise at least one curved portion between said first position and said second position.

6. The eyeglasses assembly of claim 1 wherein said second lens is connected to a support member, said support member configured to be received in a groove of said frame to connect said second lens to said frame.

7. The eyeglasses assembly of claim 6 wherein said support member and said groove are configured to allow said support member to slide in said groove.

8. The eyeglasses assembly of claim 1 wherein said frame comprises a groove configured to receive a support member connected to said second lens to movably connect said second lens to said frame.

9. The eyeglasses assembly of claim 1 wherein said second position of said second lens is located between said first position and said temple member.

10. The eyeglasses assembly of claim 1 wherein said second position of said second lens is located on said temple member.

11. The eyeglasses assembly of claim 1 wherein said first lens comprises at least one of a clear non-corrective lens, a clear corrective lens, a sunglass lens and a sunglass corrective lens.

12. The eyeglasses assembly of claim 1 wherein said second lens comprises at least one of a sunglass lens, a sunglass corrective lens, a clear non-corrective lens and a clear corrective lens.

13. An eyeglasses assembly comprising:
    an eyeglass frame;
    a temple member;
    a first lens connected to said frame and positioned to allow a wearer of said frame to look through said first lens;
    a second lens movably connected to said frame such that said second lens is movable from a first position to a second position, said first position allowing a wearer to look through the first lens and the second lens, said second position being substantially away from said first position in a direction toward said temple member; and
    wherein said frame comprises a lens cover portion and said second lens is located behind said lens cover portion such that said second lens is hidden from a front side of said frame when located in said second position, said front side being opposite from the wearer.

* * * * *